United States Patent [19]

Stapp

[11] 3,879,473

[45] Apr. 22, 1975

[54] PREPARATION OF ETHERS FROM ALCOHOLS AND OLEFINS CATALYZED BY IODINE

[75] Inventor: Paul R. Stapp, Bartlesville, Okla.

[73] Assignee: Phillips Petroleum Company, Bartlesville, Okla.

[22] Filed: Aug. 14, 1973

[21] Appl. No.: 388,140

[52] U.S. Cl.............................. 260/614 A; 260/611 R
[51] Int. Cl................................................ C07c 41/10

[58] Field of Search......... 260/614 A, 614 R, 611 R

[56] References Cited
FOREIGN PATENTS OR APPLICATIONS
393,753   6/1933   United Kingdom............. 260/614 A Primary Examiner—Howard T. Mars

[57] ABSTRACT

Dialkyl ethers are prepared by the reaction of olefins and alcohols in the presence of elemental iodine.

6 Claims, No Drawings

PREPARATION OF ETHERS FROM ALCOHOLS AND OLEFINS CATALYZED BY IODINE

This invention relates to a process for preparing ethers.

Dialkyl ethers are known to be valuable antiknock additives for high octane gasolines.

An object of this invention is to provide a novel process for the preparation of dialkyl ethers.

Other objects, aspects and advantages of the invention will be readily apparent to those skilled in the art upon reading the specification and appended claims.

According to this invention, I have discovered that dialkyl ethers are readily formed by the reaction of lower alkyl alcohols and 1-olefins when carried out in the presence of elemental iodine as catalyst.

The process of this invention can be represented by the following general reaction:

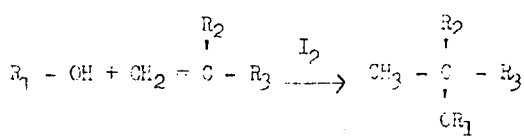

wherein $R_1$ is a lower alkyl radical having from one to six carbon atoms, and $R_2$ and $R_3$ are selected from the group consisting of hydrogen and alkyl or cycloalkyl radical groups having from one to six carbon atoms.

Examples of alcohols suitable for use in the process of this invention include: methanol, ethanol, isopropanol, tert-butanol, n-butanol and the like. Examples of olefins suitable for use in the process of this invention include: ethylene, propylene, isobutylene, 2-methyl-2-butene, 1-hexene, 2-propyl-1-pentene, 2-ethyl-1-pentene, 2-propyl-5-methyl-1-hexene, isopropenylcyclopentane, vinyl cyclohexane and the like.

The molar ratio of the alcohol to the olefin can be within the range of 20:1 to 1:20. It is preferred that the alcohol be used in quantities ranging from 0.5 to 2 moles per mole of olefin.

Elemental iodine as catalyst is specific for the process of this invention. Amounts of iodine ranging from 0.01 to 5 parts by weight per 100 parts of olefin can be used. In a preferred embodiment, 0.05 to 0.5 part of iodine per 100 parts of olefin are used.

It is generally preferred that the reactants be contacted in the absence of water. The process can be carried out in the presence or absence of diluent that is substantially completely nonreactive to the reaction environment. Suitable diluents include ethers, saturated hydrocarbons, aromatic hydrocarbons, and the like. Examples of some diluents that can be used are diethyl ether, dimethyl ether, hexane, cyclohexane, benzene, toluene and the like and mixtures thereof. In a preferred embodiment the process is conducted in the absence of additional diluent.

The process of this invention can be carried out at a temperature within the broad temperature range of 25° to 400° C. Preferably the process is carried out at temperatures ranging from 100° to 250° C.

The process is carried out at autogenous pressure, although in some instances it may be preferred to pressurize the reactor vessel with an inert diluent gas in order to maintain the reactants in the liquid phase. Thus, pressures of from 0–5,000 psig can be employed.

The reaction time will be in the range of 1 minute to 10 hours depending upon reaction conditions, the contacting techniques used and the desired degree of conversion.

The process can be carried out either batchwise or continuously.

The product can be recovered and isolated by any method known in the art. It is generally desirable to remove the unreacted olefin by flash evaporation. The diluent, if used, can also, in general, be removed by flash evaporation. The remaining reaction mixture can then be distilled or separated by any suitable means.

The invention is further illustrated by the following example:

EXAMPLE

250 Milliliters of methanol, 300 grams of isobutylene and 0.5 gram of iodine crystals were charged to a 1-liter stirred autoclave. The reactor was sealed, then heated to 200° C for 4½ hours. During the reaction period the autogenous pressure decreased from 2,900 to 2,600 psig. The reactor was cooled to room temperature and the unreacted isobutylene was flash distilled out of the autoclave.

Gas-liquid chromatographic analyses of the flashed olefin and the residue revealed that 9.7 weight percent of the isobutylene was converted to products of which 79 weight percent was methyl t-butyl ether. Identification of the product was achieved by comparison of glc retention time to that of the known compound. Yield and specificity were determined by applying composition of fractions (as percent of area under glc curves) to weight of recovered fractions.

While a specific embodiment of the invention has been described for illustrative purposes, the invention is not limited thereto. Various other modifications and embodiments of the invention will be apparent to those skilled in the art in view of this disclosure. Such modifications or embodiments are within the scope and spirit of this disclosure.

I claim:

1. A process for the preparation of ethers having the general formula

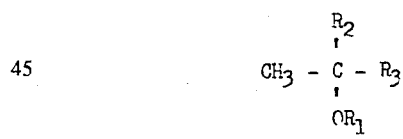

wherein $R_1$ is an alkyl group having from one to six carbon atoms and $R_2$ and $R_3$ are individually selected from the group consisting of hydrogen and alkyl or cycloalkyl groups having up to six carbon atoms, which comprises contacting an alcohol having the general formula

wherein $R_1$ is as defined hereinbefore, with a 1-olefin having the general formula

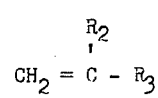

wherein $R_2$ and $R_3$ are as defined hereinbefore, in the presence of elemental iodine as catalyst at a temperature from 25° to 400°C under autogenous pressure.

2. The process of claim 1 wherein said alcohol and said olefin are present in molar ratios ranging from 20:1 to 1:20.

3. The process of claim 2 wherein said iodine is present in amounts ranging from 0.01 to 5 parts per 100 parts of said olefin.

4. The process of claim 3 wherein said alcohol is present in amounts ranging from 0.5 to 2 moles per mole of said olefin.

5. The process of claim 4 wherein said iodine is present in amounts ranging from 0.05 to 0.5 parts per 100 parts of said olefin.

6. The process of claim 5 wherein said alcohol is methanol and said olefin is isobutylene.

* * * * *